United States Patent
Collins et al.

(10) Patent No.: US 6,926,832 B2
(45) Date of Patent: Aug. 9, 2005

(54) METHOD OF USING WATER SOLUBLE POLYMERS IN A MEMBRANE BIOLOGICAL REACTOR

(75) Inventors: John H. Collins, Bloomingdale, IL (US); Kristine S. Salmen, Glen Ellyn, IL (US); Deepak A. Musale, Naperville, IL (US); Seong-Hoon Yoon, Naperville, IL (US); William J. Ward, Glen Ellyn, IL (US)

(73) Assignee: Nalco Company, Naperville, IL (US)

(*) Notice: Subject to any disclaimer, the term of this patent is extended or adjusted under 35 U.S.C. 154(b) by 125 days.

(21) Appl. No.: 10/329,791

(22) Filed: Dec. 26, 2002

(65) Prior Publication Data

US 2003/0159990 A1 Aug. 28, 2003

Related U.S. Application Data

(63) Continuation-in-part of application No. 10/035,785, filed on Jan. 4, 2002, now Pat. No. 6,723,245.

(51) Int. Cl.⁷ ............................. C02F 3/07; C02F 1/52
(52) U.S. Cl. ................ 210/615; 210/620; 210/631; 210/636; 210/637; 210/639; 210/702; 210/732; 210/733; 210/734; 210/735
(58) Field of Search ................. 210/605, 614, 210/615, 620, 622, 623, 631, 636, 637, 639, 650, 651, 702, 733–735

(56) References Cited

U.S. PATENT DOCUMENTS

| | | | |
|---|---|---|---|
| 3,472,765 A | 10/1969 | Budd et al. | |
| 4,749,494 A | 6/1988 | Tomoyasu et al. | |
| 5,254,253 A | 10/1993 | Behmann | |
| 5,266,203 A | 11/1993 | Mukhopadhyay et al. | |
| 5,494,577 A | 2/1996 | Rekers | |
| 5,558,774 A | 9/1996 | Tonelli et al. | |
| 5,914,040 A | 6/1999 | Pescher et al. | |
| 5,932,099 A | 8/1999 | Cote et al. | |
| 6,027,649 A | * 2/2000 | Benedek et al. | 210/639 |
| 6,313,246 B1 | 11/2001 | Carter et al. | |
| 6,416,668 B1 | 7/2002 | Al-Samadi | |
| 6,428,705 B1 | 8/2002 | Allen et al. | |
| 6,517,723 B1 | 2/2003 | Daigger et al. | |

FOREIGN PATENT DOCUMENTS

| | | |
|---|---|---|
| EP | 888810 | 1/1999 |
| JP | 63091196 | 4/1988 |
| JP | 3004996 | 1/1991 |
| JP | 4004098 | 1/1992 |
| JP | 5345195 | 12/1993 |
| JP | 7232192 | 9/1995 |

OTHER PUBLICATIONS

–Ing., D., Nguyen, M.–T., Ripperger, S., "Effect of Flocculants on the Microfiltration of Fine Suspension", Lehrstuhl für Mechanische Verfahrenstechnik, Technische Universität Dresden, MVT, International Congress on Membranes & Membrane Process, Jul. 2002.

Nguyen, M.–T., Ripperger, S., "Investigation on the effect of flocculants on the filtration behavior in microfiltration of fine particles", Desalination 147, pp. 37–42, Elsevier Science B. V., 2002.

Byrne, W., "Reverse Osmosis, A Practical Guide for Industrial Users", Tall Oaks Publishing Inc., p. 207.

(Continued)

*Primary Examiner*—Joseph Drodge
(74) *Attorney, Agent, or Firm*—Michael B. Martin; Thomas M. Breininger

(57) ABSTRACT

A method of conditioning mixed liquor in a membrane biological reactor comprising adding to the mixed liquor an effective coagulating and flocculating amount of one or more water soluble cationic, amphoteric or zwitterionic polymers, or combination thereof and methods of reducing membrane fouling, enhancing membrane flux and reducing sludge production.

17 Claims, 2 Drawing Sheets

OTHER PUBLICATIONS

Wakeman, R.J., Akay, G., "Flux decay and rejection during micro– and ultra–filtration of hydrophobically modified water–soluble polymers", Journal of Membrane Science 91, pp. 145–152, Elsevier Science B. V., 1994.

Bergman, R.A., Joffe, D., Adams, N., Porter, R., "Gwinnett County Water Reclamation with 50 mgd Ultrafiltration—Proof Testing and Design", American Water Works Association, Membrane Technology Conference, pp. 1–13, 2003.

"Design Considerations for Small Drinking Water Membrane Systems", Pall Corporation, www.pall.com/water_8155.asp, pp. 1–5.

"Indirect Potable Water Reuse, San Diego Water Purification Project", www.cmhc–schl.gc.ca/en/imquaf/himu/wacon/wacon_016.cfm, pp. 1–3.

Lainé, J.M., Campos, C., Baudin, I., Janex, M.L., Understanding Membrane Fouling: A Review of Over a Decade of Research, Ondeo Services—CIRSEE.Email: jean–michel.laine@ondeo.com, pp. 351–361.

"Chemical Pretreatment For RO and NF", Technical Application Bulletin No. 111, Revision A, Hydranautics A Nitto Denko Corporation, www.membranes.com, pp. 1–15, Mar. 22, 2002.

"HYDRACoRe Chlorine Tolerant Spiral Wound Nanofiltration Color Removal Membrane Elements", Technical Application Bulletin No. 109, Revision B, Hydranautics A Nitto Denko Corporation, www.membranes.com, pp. 1–10, Feb. 22, 2002.

"Death Taxes . . . and RO Membrane Fouling", GE Water Technologies, Water Technology 69, www.gewater.com/library/tp/701_Death_Taxes.jsp, pp. Nov. 1–6, 1995.

Gould, C.K., Harrold, S.J., Weitnauer, A.K., "A Practical Approach to Controlling the Fouling of Ultrafiltration Membranes: A Case Study of the Successful Development of a Commercial Soy Protein Application", www.environmental–center.com/articles/article384/article384.htm, pp. 1–14, Apr. 1992.

"Chemical Compatibility Desal Membrane Products—Membrane Types and Product Designations".

Layson, A., "Microfiltration—Current Know–how and Future Directions", IMSTEC, Sydney, Australia, 2003.

Roquebert, V., Cleveland, C., Leaf, D., "Identifying and Resolving Key Design Considerations for Integration of Low Pressure Membrane Filtration and Lime Softening Process", AWWA Membrane Technology Conference, Atlanta, Georgia 2003.

M. Gander et al., "Aerobic MBRs for domestic wastewater treatment: a review with cost considerations", Separation and Purification Technology, 18, (2000), 119–130.

"Livestock Wastewater Treatment and Reuse System", Case Report, Mitsubishi Rayon Co., Ltd. (2000).

"Dairy and Ume Plum Processing Wastewater Treatment System", Case Report, Mitsubishi Rayon Co., Ltd. (2000).

"Food Plant Wastewater Treatment and Recycling System", Case Report, Mitsubishi Rayon Co., Ltd. (2000).

"Noodle Plant Wastewater Treatment System", Case Report, Mitsubishi Rayon Co., Ltd. (2000).

"Confectionary Plant Wastewater Treatment System", Case Report, Mitsubishi Rayon Co., Ltd. (2000).

"Local Brewery Wastewater Treatment System", Case Report, Mitsubishi Rayon Co., Ltd. (2000).

"Family Restaurant Sewage Treatment System", Case Report, Mitsubishi Rayon Co., Ltd. (2000).

"Tofu Plant Wastewater Treatment System", Case Report, Mitsubishi Rayon Co., Ltd. (2000).

"Wastewater Recycling at a Resort Hotel", Case Report, Mitsubishi Rayon Co., Ltd. (2000).

"Advanced Treatment of Hospital Wastewater", Case Report, Mitsubishi Rayon Co., Ltd. (2000).

* cited by examiner

METHOD OF USING WATER SOLUBLE POLYMERS IN A MEMBRANE BIOLOGICAL REACTOR

CROSS REFERENCE TO RELATED APPLICATIONS

This is a continuation-in-part of Ser. No. 10/035,785, filed Jan. 4, 2002, now U.S. Pat. No. 6,723,245.

TECHNICAL FIELD

This invention concerns the use of water soluble cationic, amphoteric or zwitterionic polymers to condition mixed liquor in membrane biological reactors resulting in reduced fouling and increased water flux through the membrane. This invention is also a method of using the polymers to reduce sludge production in the bioreactor.

BACKGROUND OF THE INVENTION

Biological treatment of wastewater for removal of dissolved organics is well known and is widely practiced in both municipal and industrial plants. This aerobic biological process is generally known as the "activated sludge" process in which micro-organisms consume the organic compounds through their growth. The process necessarily includes sedimentation of the micro-organisms or "biomass" to separate it from the water and complete the process of reducing Biological Oxygen Demand (BOD) and TSS (Total Suspended Solids) in the final effluent. The sedimentation step is typically done in a clarifier unit. Thus, the biological process is constrained by the need to produce biomass that has good settling properties. These conditions are especially difficult to maintain during intermittent periods of high organic loading and the appearance of contaminants that are toxic to the biomass.

Typically, this activated sludge treatment has a conversion ratio of organic materials to sludge of about 0.5 kg sludge/kg COD (chemical oxygen demand), thereby resulting in the generation of a considerable amount of excess sludge that must to be disposed of. The expense for the excess sludge treatment has been estimated at 40–60 percent of the total expense of wastewater treatment plant. Moreover, the conventional disposal method of landfilling may cause secondary pollution problems. Therefore, interest in methods to reduce the volume and mass of the excess sludge has been growing rapidly.

Membranes coupled with biological reactors for the treatment of wastewater are well known, but are not widely practiced. In these systems, ultrafiltration (UF), microfiltration (MF) or nanofiltration (NF) membranes replace sedimentation of biomass for solids-liquid separation. The membrane can be installed in the bioreactor tank or in an adjacent tank where the mixed liquor is continuously pumped from the bioreactor tank and back producing effluent with much lower total suspended solids (TSS), typically less than 5 mg/L, compared to 20 to 50 mg/L from a clarifier.

More importantly, MBRs (membrane biological reactors) de-couple the biological process from the need to settle the biomass, since the membrane sieves the biomass from the water. This allows operation of the biological process at conditions that would be untenable in a conventional system including: 1) high MLSS (bacteria loading) of 10–30 g/L, 2) extended sludge retention time, and 3) short hydraulic retention time. In a conventional system, such conditions could lead to sludge bulking and poor settleability.

The benefits of the MBR operation include low sludge production, complete solids removal from the effluent, effluent disinfection, combined COD, solids and nutrient removal in a single unit, high loading rate capability, no problems with sludge bulking, and small footprint. Disadvantages include aeration limitations, membrane fouling, and membrane costs.

Membrane costs are directly related to the membrane area needed for a given volumetric flow through the membrane, or "flux." Flux is expressed as liters/hour/m$^2$ (LMH) or gallons/day/ft$^2$ (GFD). Typical flux rates vary from approximately 10 LMH to about 50 LMH. These relatively low flux rates, due largely to fouling of the membranes, have slowed the growth of MBR systems for wastewater treatment.

The MBR membrane interfaces with so-called "mixed liquor" which is composed of water, dissolved solids such as proteins, polysaccharides, suspended solids such as colloidal and particulate material, aggregates of bacteria or "flocs", free bacteria, protozoa, and various dissolved metabolites and cell components. In operation, the colloidal and particulate solids and dissolved organics deposit on the surface of the membrane. Colloidal particles form layer on the surface of the membrane called a "cake layer." Cake layer formation is especially problematic in MBRs operated in the "dead end" mode where there is no cross flow; i.e., flow tangential to the membrane. Depending on the porosity of the cake layer, hydraulic resistance increases and flux declines.

In addition to the cake formation on the membrane, small particles can plug the membrane pores, a fouling condition that may not be reversible. Compared to a conventional activated sludge process, floc (particle) size is reportedly much smaller in typical MBR units. Since MBR membrane pore size varies from about 0.04 to about 0.4 micrometers, particles smaller than this can cause pore plugging. Pore plugging increases resistance and decreases flux.

Therefore, there is an ongoing need to develop improved methods of conditioning the mixed liquor in MBR units to increase flux and reduce fouling of the membranes.

SUMMARY OF THE INVENTION

Polymeric water-soluble coagulants and flocculants have not been used in MBR units, as it is generally understood that excess polymer fouls membrane surfaces, resulting in dramatic decreases in membrane flux.

However, we have discovered that using certain water soluble cationic, amphoteric and zwitterionic polymers in the MBR to coagulate and flocculate the biomass in the mixed liquor and to precipitate the soluble biopolymer substantially reduces fouling of the membrane and can result in an increase of up to 500 percent in membrane flux while leaving virtually no excess polymer in the treated wastewater at the effective dose. This increase in membrane flux permits the use of smaller systems, with a concomitant reduction in capital costs, or alternatively, increases treated wastewater volumetric flow from an existing system, with a corresponding reduction in cost of operation.

Accordingly, this invention is a method of conditioning the mixed liquor in a membrane biological reactor comprising adding to the mixed liquor an effective coagulating and flocculating amount of one or more water soluble cationic, amphoteric or zwitterionic polymers, or combination thereof.

In another aspect, this invention is a method of clarifying wastewater in a membrane biological reactor where microorganisms consume organic material in the wastewater to form a mixed liquor comprising water, the microorganisms and dissolved and suspended solids comprising (i) adding to the mixed liquor an effective coagulating and flocculating amount of one or more cationic, amphoteric or zwitterionic polymers, or a mixture thereof, to form a mixture comprising water, the microorganisms and coagulated and flocculated solids; and (ii) separating clarified water from the microorganisms and the coagulated and flocculated solids by filtration through a membrane.

In another aspect, this invention is a method of preventing fouling of a filtration membrane in a membrane biological reactor where microorganisms consume organic material in the wastewater in a mixed liquor comprising water, the microorganisms and dissolved, colloidal and suspended solids and wherein clarified water is separated from the mixed liquor by filtration through the filtration membrane comprising adding to the mixed liquor an amount of one or more cationic, amphoteric or zwitterionic polymers, or a combination thereof, sufficient to prevent fouling of the membrane.

In another aspect, this invention is a method of enhancing flux through a filtration membrane in a membrane biological reactor where microorganisms consume organic material in the wastewater in a mixed liquor comprising water, the microorganisms and dissolved, colloidal and suspended solids and wherein clarified water is separated from the mixed liquor by filtration through the filtration membrane comprising adding to the mixed liquor an effective flux enhancing amount of one or more cationic, amphoteric or zwitterionic polymers, or a combination thereof.

In another aspect, this invention is a method of reducing sludge formation in a membrane biological reactor where microorganisms consume organic material in the wastewater to form a mixed liquor comprising water, the microorganisms and a sludge comprising dissolved, colloidal and suspended solids and wherein clarified water is separated from the mixed liquor by filtration through a membrane comprising 1) adding to the mixed liquor an effective coagulating and flocculating amount of one or more cationic, amphoteric or zwitterionic polymers, or a combination thereof; and
2) increasing the concentration of microorganisms in the mixed liquor.

In another aspect, this invention is a method of reducing sludge formation in a membrane biological reactor where microorganisms consume organic material in the wastewater to form a mixed liquor comprising water, the microorganisms and a sludge comprising dissolved, colloidal and suspended solids and wherein clarified water is separated from the mixed liquor by filtration through a membrane comprising 1) adding to the mixed liquor an effective coagulating and flocculating amount of one or more cationic, amphoteric or zwitterionic polymers, or a combination thereof, and
2) increasing the amount of time that the microorganisms remain in contact with the wastewater.

BRIEF DESCRIPTION OF THE DRAWINGS

In FIG. 2, the slope of tangent line 1) decreases with higher hydraulic retention time (HRT) while MLSS is constant and 2) decreases with higher MLSS while HRT is constant. For the first case, in which MLSS is constant, for example 14,000 mg/L, no excess sludge will be produced by increasing the HRT to 12 hours. For the second case in which HRT is fixed, for example 10 hours, no sludge will be produced by increasing the MLSS to 17,000 mg/L.

Figure 1:
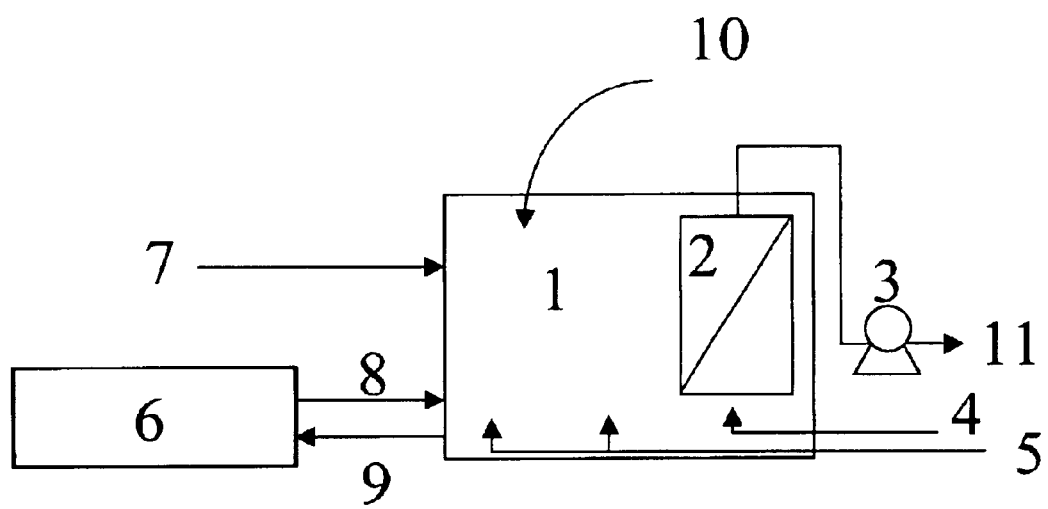
FIG. 1 is a schematic diagram of a typical membrane bioreactor system for the biological treatment of wastewater comprising an aeration tank 1, submerged membrane module 2, suction pump 3, aeration means 4 for membrane scouring, aeration means 5 for the bioreaction and optional sludge disintegrator 6.
Figure 2:
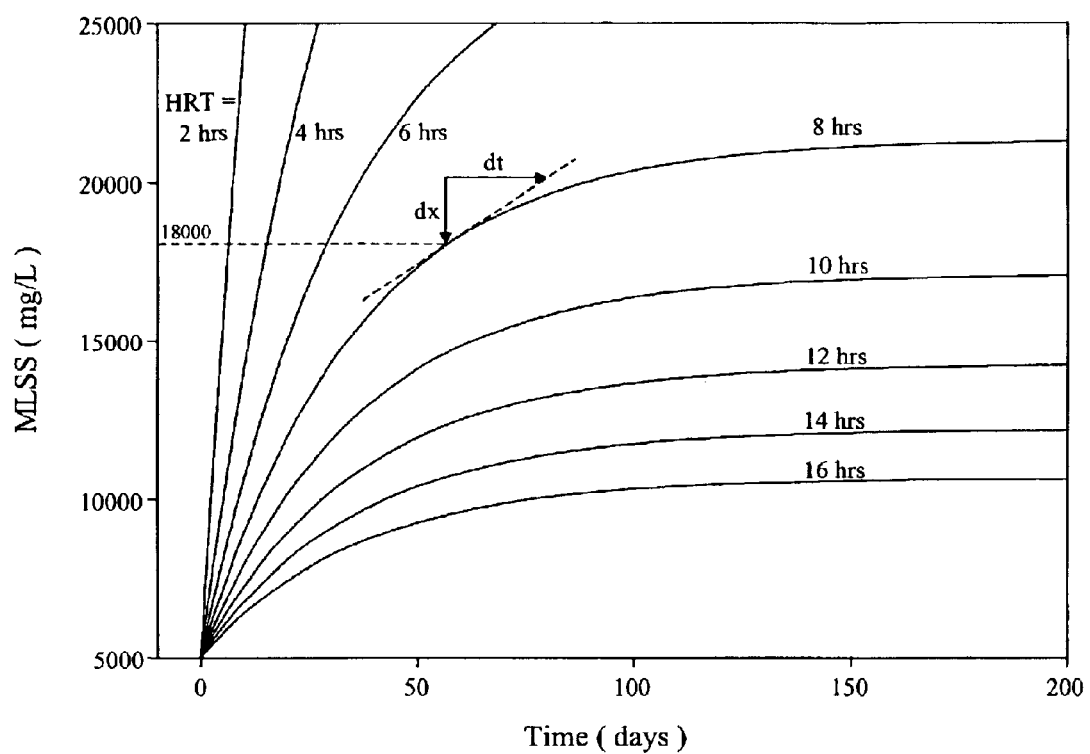
FIG. 2 shows sludge build-up curves calculated by simultaneously solving Equations 1 and 2 below. The parameters and constants used in this calculation were summarized in Tables 1 and 2. The sludge production rate at a particular mixed liquor suspended solids (MLSS) value (for example 18,000 mg L$^{-1}$) can be obtained from the slope of a tangent line. Therefore 'zero slope' means 'no sludge production'.

Sludge retention time (SRT) is calculated by dividing the total amount of sludge in the bioreactor (kg) by sludge removal rate (kg/day). Therefore SRT will increase with less excess sludge production until it finally becomes 'infinite' without excess sludge production.

In a biological wastewater treatment process, microorganisms in the bioreactor grow with the consumption of organic substrate contained in wastewater. In addition, the microorganisms respire endogenously, consuming themselves. These phenomena are described by Eq (1), where microbial growth is expressed by the Monod equation minus endogenous respiration represented by the first order kinetic equation ($k_d x$) on the far the right side of the equation.

$$\frac{dx}{dt} = \frac{\mu_m S_e}{K_s + S_e} x - k_d x \quad (1)$$

Here, $\mu_m$ is the maximum specific growth rate (day$^{-1}$), $K_s$ is the half saturation constant (mg L$^{-1}$), $k_d$ is the endogenous decay constant (day$^{-1}$), $S_e$ is the substrate concentration in mixed liquor (mg L$^{-1}$), x is the MLSS (mg L$^{-1}$) and t is the time (days).

While microorganisms are growing, the majority of the substrate (organic pollutants in the influent) is consumed and some is going out with effluent. This balance can be described as Eq (2) where the first term on the right side expresses the organic mass balance between influent and effluent and the second term substrate consumption by microorganisms.

$$\frac{dS_e}{dt} = \frac{Q}{V}(S_i - S_e) - \frac{1}{Y} \frac{\mu_m S_e}{K_s + S_e} x \quad (2)$$

Where Q is the influent flow rate (m$^3$ day$^{-1}$) and Y is the yield coefficient (kg MLSS kg COD$^{-1}$), V is the reactor volume (m$^3$) and $S_i$ is the influent COD (mg L$^{-1}$). All constants and parameters used in the foregoing calculations are summarized in Tables 1 and 2.

TABLE 1

Values of kinetic and stoichiometric parameters used in calculation

| Parameter | Unit | Value |
| --- | --- | --- |
| $k_d^1$ | Day$^{-1}$ | 0.028 |
| $K_s^{2,3}$ | mg L$^{-1}$ | 100 |
| $Y^3$ | kg MLSS kg COD$^{-1}$ | 0.5 |

TABLE 1-continued

Values of kinetic and stoichiometric parameters used in calculation

| Parameter | Unit | Value |
|---|---|---|
| $\beta^3$ | kg COD kg MLSS$^{-1}$ | 1.2 |
| $\mu_m^{2,3}$ | day$^{-1}$ | 3 |

[1] Nagaoka H., Yamanishi S. and Miya A. (1998) Modeling of biofouling by extracellular polymers in a membrane separation activated sludge system, Water Science and Technology 38(4–5) 497–504.
[2] Henze M., Grady C. P. L., Gujer W., Marais G. V. R. and Matsuo T. (1987) A general model for single-sludge wastewater treatment systems, Water Research 21(5) 505–515.
[3] Grady C. P. L., Daigger G. T. and Lim H. C., (1999) Biological Wastewater Treatment, pp61–125, Marcel Dekker, NY.

TABLE 2

Values of operational parameters used in calculation[3]

| Parameter | Unit | Value |
|---|---|---|
| Q | m$^3$ day$^{-1}$ | 1 × 10$^3$ |
| $S_e$ (t = 0) | mg L$^{-1}$ | 30 |
| $S_i$ | mg L$^{-1}$ | 400 |
| x (t = 0) | mg L$^{-1}$ | 5,000 |

*Grady et al. (1999)

DETAILED DESCRIPTION OF THE INVENTION

Definitions of Terms

As used herein, the following abbreviations and terms have the following meanings: AcAm for acrylamide; DMAEA.BCQ for dimethylaminoethylacrylate benzyl chloride quaternary salt; DMAEA.MCQ for dimethylaminoethylacrylate methyl chloride quaternary salt; Epi-DMA for epichlorohydrin-dimethylamine; DADMAC for diallyldimethylammonium chloride; pDADMAC for poly(diallyldimethylammonium chloride); and PEI for polyethyleneimine.

"Amphoteric polymer" means a polymer derived from both cationic monomers and anionic monomers, and, possibly, other non-ionic monomer(s). Amphoteric polymers can have a net positive or negative charge. Representative amphoteric polymers include acrylic acid/DMAEA.MCQ copolymer, DADMAC/acrylic acid copolymer, DADMAC/acrylic acid/acrylamide terpolymer, and the like.

The amphoteric polymer may also be derived from zwitterionic monomers and cationic or anionic monomers and possibly nonionic monomers. Representative amphoteric polymers containing zwitterionic monomers include DMAEA.MCQ/N,N-dimethyl-N-methacrylamidopropyl-N-(3-sulfopropyl)-ammonium betaine copolymer, acrylic acid/N,N-dimethyl-N-methacrylamidopropyl-N-(3-sulfopropyl)-ammonium betaine copolymer, DMAEA.MCQ/Acrylic acid/N,N-dimethyl-N-methacrylamidopropyl-N-(3-sulfopropyl)-ammonium betaine terpolymer, and the like.

"Anionic monomer" means a monomer as defined herein which possesses a negative charge above a certain pH range. Representative anionic monomers include acrylic acid, and it's salts, including, but not limited to sodium acrylate, and ammonium acrylate, methacrylic acid, and it's salts, including, but not limited to sodium methacrylate, and ammonium methacrylate, 2-acrylamido-2-methylpropanesulfonic acid (AMPS), the sodium salt of AMPS, sodium vinyl sulfonate, styrene sulfonate, maleic acid, and it's salts, including but not limited to the sodium salt, and ammonium salt, sulfonate, itaconate, sulfopropyl acrylate or methacrylate or other water-soluble forms of these or other polymerisable carboxylic or sulphonic acids. Sulfomethylated acrylamide, allyl sulfonate, sodium vinyl sulfonate, itaconic acid, acrylamidomethylbutanoic acid, fumaric acid, vinylphosphonic acid, vinylsulfonic acid, allylphosphonic acid, sulfomethylated acrylamide, phosphonomethylated acrylamide, and the like.

"Cationic polymer" means a polymer having an overall positive charge. The cationic polymers of this invention include polymers composed entirely of cationic monomers and polymers composed of cationic and nonionic monomers. Cationic polymers also include condensation polymers of epichlorohydrin and a dialkyl monoamine or polyamine and condensation polymers of ethylenedichloride and ammonia or formaldehyde and an amine salt. Cationic polymers of this invention include solution polymers, emulsion polymers, dispersion polymers and structurally modified polymers as described in PCT US01/10867.

"Cationic monomer" means a monomer which possesses a net positive charge. Representative cationic monomers include dialkylaminoalkyl acrylates and methacrylates and their quaternary or acid salts, including, but not limited to, dimethylaminoethyl acrylate methyl chloride quaternary salt, dimethylaminoethyl acrylate methyl sulfate quaternary salt, dimethyaminoethyl acrylate benzyl chloride quaternary salt, dimethylaminoethyl acrylate sulfuric acid salt, dimethylaminoethyl acrylate hydrochloric acid salt, dimethylaminoethyl methacrylate methyl chloride quaternary salt, dimethylaminoethyl methacrylate methyl sulfate quaternary salt, dimethylaminoethyl methacrylate benzyl chloride quaternary salt, dimethylaminoethyl methacrylate sulfuric acid salt, dimethylaminoethyl methacrylate hydrochloric acid salt, dialkylaminoalkylacrylamides or methacrylamides and their quaternary or acid salts such as acrylamidopropyltrimethylammonium chloride, dimethylaminopropyl acrylamide methyl sulfate quaternary salt, dimethylaminopropyl acrylamide sulfuric acid salt, dimethylaminopropyl acrylamide hydrochloric acid salt, methacrylamidopropyltrimethylammonium chloride, dimethylaminopropyl methacrylamide methyl sulfate quaternary salt, dimethylaminopropyl methacrylamide sulfuric acid salt, dimethylaminopropyl methacrylamide hydrochloric acid salt, diethylaminoethylacrylate, diethylaminoethylmethacrylate, diallyldiethylammonium chloride and diallyldimethyl ammonium chloride. Alkyl groups are generally $C_{1-4}$ alkyl.

"Conditioning" means precipitating soluble biopolymer and coagulating and flocculating the particulate and colloidal organic material in the mixed liquor to form larger aggregates of particles, resulting in an increase in flux through the membrane bioreactor filtration membrane and a reduction of fouling of the membrane.

"Hydraulic retention time" (HRT) means the time the wastewater stays in the bioreactor. It is obtained by dividing the total volume of the bioreactor by the influent flow rate.

"Mixed Liquor" or "sludge" means a mixture of wastewater, microorganisms used to degrade organic materials in the wastewater, organic-containing material derived from cellular species, cellular by-products and/or waste products, or cellular debris. Mixed liquor can also contain colloidal and particulate material (i.e. biomass/biosolids) and/or soluble molecules or biopolymers (i.e. polysaccharides, proteins, etc.).

"Mixed liquor suspended solids" (MLSS) means the concentration of biomass which is treating organic material, in the mixed liquor.

"Monomer" means a polymerizable allylic, vinylic or acrylic compound. The monomer may be anionic, cationic or nonionic. Vinyl monomers are preferred, acrylic monomers are more preferred.

"Nonionic monomer" means a monomer which is electrically neutral. Representative nonionic monomers include acrylamide, methacrylamide, N-methylacrylamide, N,N-dimethyl(meth)acrylamide, N,N-diethyl(meth)acrylamide, N-isopropyl(meth)acrylamide, N-t-butyl(meth)acrylamide, N-(2-hydroxypropyl)methacrylamide, N-methylolacrylamide, N-vinylformamide, N-vinylacetamide, N-vinyl-N-methylacetamide, poly(ethylene glycol)(meth)acrylate, poly(ethylene glycol) monomethyl ether mono(meth)acryate, N-vinyl-2-pyrrolidone, glycerol mono((meth)acrylate), 2-hydroxyethyl(meth)acrylate, 2-hydroxypropyl(meth)acrylate, vinyl methylsulfone, vinyl acetate, glycidyl(meth)acrylate, and the like.

"Prevention" includes both preventing and inhibiting.

"Sludge Retention time" (SRT) means the amount of time that microorganisms, which roughly approximates sludge, remain inside the bioreactor. SRT is calculated by dividing the total sludge in the bioreactor by the sludge removal rate.

"Zwitterionic monomer" means a polymerizable molecule containing cationic and anionic (charged) functionality in equal proportions, so that the molecule is net neutral overall. Representative zwitterionic monomers include N,N-dimethyl-N-acryloyloxyethyl-N-(3-sulfopropyl)-ammonium betaine, N,N-dimethyl-N-acrylamidopropyl-N-(2-carboxymethyl)-ammonium betaine, N,N-dimethyl-N-acrylamidopropyl-N-(3-sulfopropyl)-ammonium betaine, N,N-dimethyl-N-methacrylamidopropyl-N-(3-sulfopropyl)-ammonium betaine (DMMAPSB), N,N-dimethyl-N-acrylamidopropyl-N-(2-carboxymethyl)-ammonium betaine, 2-(methylthio)ethyl methacryloyl-S-(sulfopropyl)-sulfonium betaine, 2-[(2-acryloylethyl)dimethylammonio] ethyl 2-methyl phosphate, 2-(acryloyloxyethyl)-2'-(trimethylammonium)ethyl phosphate, [(2-acryloylethyl)dimethylammonio]methyl phosphonic acid, 2-methacryloyloxyethyl phosphorylcholine (MPC), 2-[(3-acrylamidopropyl)dimethylammonio]ethyl 2'-isopropyl phosphate (AAPI), 1-vinyl-3-(3-sulfopropyl)imidazolium hydroxide, (2-acryloxyethyl) carboxymethyl methylsulfonium chloride, 1-(3-sulfopropyl)-2-vinylpyridinium betaine, N-(4-sulfobutyl)-N-methyl-N,N-diallylamine ammonium betaine (MDABS), N,N-diallyl-N-methyl-N-(2-sulfoethyl) ammonium betaine, and the like. A preferred zwitterionic monomer is N,N-dimethyl-N-methacrylamidopropyl-N-(3-sulfopropyl)-ammonium betaine.

"Zwitterionic polymer" means a polymer composed from zwitterionic monomers and, possibly, other non-ionic monomer(s). Representative zwitterionic polymers include homopolymers such as the homopolymer of N,N-dimethyl-N-(2-acryloyloxyethyl)-N-(3-sulfopropyl) ammonium betaine, copolymers such as the copolymer of acrylamide and N,N-dimethyl-N-(2-acryloyloxyethyl)-N-(3-sulfopropyl) ammonium betaine, and terpolymers such as the terpolymer of acrylamide, N-vinyl-2-pyrrolidone, and 1-(3-sulfopropyl)-2-vinylpyridinium betaine. In zwitterionic polymers, all the polymer chains and segments within those chains are rigorously electrically neutral. Therefore, zwitterionic polymers represent a subset of amphoteric polymers, necessarily maintaining charge neutrality across all polymer chains and segments because both anionic charge and cationic charge are introduced within the same zwitterionic monomer.

"Reduced Specific Viscosity" (RSV) is an indication of polymer chain length and average molecular weight. The RSV is measured at a given polymer concentration and temperature and calculated as follows:

$$RSV = \frac{\left[\left(\frac{\eta}{\eta_0}\right) - 1\right]}{c}$$

wherein $\eta$=viscosity of polymer solution;
$\eta_o$=viscosity of solvent at the same temperature; and
c=concentration of polymer in solution.

As used herein, the units of concentration "c" are (grams/100 ml or g/deciliter). Therefore, the units of RSV are dl/g. The RSV is measured at 30° C. The viscosities $\eta$ and $\eta_o$ are measured using a Cannon-Ubbelohde semimicro dilution viscometer, size 75. The viscometer is mounted in a perfectly vertical position in a constant temperature bath adjusted to 30±0.02° C. The error inherent in the calculation of RSV is about 2 dl/g. Similar RSVs measured for two linear polymers of identical or very similar composition is one indication that the polymers have similar molecular weights, provided that the polymer samples are treated identically and that the RSVs are measured under identical conditions.

IV stands for intrinsic viscosity, which is RSV in the limit of infinite polymer dilution (i.e. the polymer concentration is equal to zero). The IV, as used herein, is obtained from the y-intercept of the plot of RSV versus polymer concentration in the range of 0.015–0.045 wt % polymer.

Preferred Embodiments

The water soluble cationic, amphoteric or zwitterionic polymers of this invention are added to the MBR unit to promote the incorporation of colloidal particles, such as cell fragments and single bacterium, into aggregate or floc structures and/or to increase the porosity of the cake layer. The water soluble polymers may be solution polymers, latex polymers, dry polymers or dispersion polymers.

"Latex polymer" means an invertible water-in-oil polymer emulsion comprising a cationic, amphoteric or zwitterionic polymer according to this invention in the aqueous phase, a hydrocarbon oil for the oil phase, a water-in-oil emulsifying agent and, potentially, an inverting surfactant. Inverse emulsion polymers are hydrocarbon continuous with the water-soluble polymers dispersed as micron sized particles within the hydrocarbon matrix. The latex polymers are then "inverted" or activated for use by releasing the polymer from the particles using shear, dilution, and, generally, another surfactant, which may or may not be a component of the inverse emulsion.

The preparation of water-in-oil emulsion polymers has been described in, for example, U.S. Pat. Nos. 2,982,749; 3,284,393; and 3,734,873. See also Hunkeler et al., "Mechanism, Kinetics and Modeling of the Inverse-Microsuspension Homopolymerization of Acrylamide", *Polymer* (1989), 30(1), 127–42; and Hunkeler et al., "Mechanism, Kinetics and Modeling of Inverse-Microsuspension Polymerization: 2. Copolymerization of Acrylamide with Quaternary Ammonium Cationic Monomers", *Polymer* (1991), 32(14), 2626–40.

Latex polymers are prepared by dissolving the desired monomers in the aqueous phase, dissolving the emulsifying agent(s) in the oil phase, emulsifying the water phase in the oil phase to prepare a water-in-oil emulsion, in some cases, homogenizing the water-in-oil emulsion, polymerizing the monomers dissolved in the water phase of the water-in-oil emulsion to obtain the polymer as a water-in-oil emulsion. If so desired, a self-inverting surfactant can be added after the polymerization is complete in order to obtain the water-in-oil self-inverting emulsion.

"Dispersion polymer" means a water-soluble polymer dispersed in an aqueous continuous phase containing one or more inorganic/organic salts. Representative examples of polymers prepared by dispersion polymerization of water-soluble monomers in an aqueous continuous phase are found in, for example U.S. Pat. Nos. 4,929,655; 5,006,590; 5,597,859; and 5,597,858, in European Patent Nos. 657,478; and 630,909 and in PCT/US01/09060.

A general procedure for the manufacture of dispersion polymers is as follows. The types and quantities of specific components in the formula (salts and stabilizer polymers, for example) will vary depending upon the particular polymer that is being synthesized.

An aqueous solution containing one or more inorganic salts, one or more monomers and any additional water-soluble monomers, any polymerization additives such as chelants, pH buffers, chain transfer agents, branching or cross-linking agents and one or more water-soluble stabilizer polymers is charged to a reactor equipped with a mixer, a thermocouple, a nitrogen purging tube, and a water condenser.

The monomer solution is mixed vigorously, heated to the desired temperature, and then a water-soluble initiator is added. The solution is purged with nitrogen while maintaining temperature and mixing for several hours. After this time, the products are cooled to room temperature, and any post-polymerization additives are charged to the reactor. Water continuous dispersions of water-soluble polymers are free flowing liquids with product viscosities generally 100–10,000 cP, measured at low shear.

"Solution polymer" means a water soluble polymer in a water continuous solution.

In a solution polymerization process, one or more monomers are added to a vessel followed by neutralization with a suitable base. Water is then added to the reaction vessel, which is then heated and purged. Polymerization catalysts may also be added to the vessel initially or fed in gradually during the course of the reaction. Water soluble polymerization initiators such as any azo or redox initiator or combination thereof are added along with the monomer solution to the reaction mixture in separate feeds over the same amount of time. Heating or cooling may be used as necessary to control the reaction rate. Additional initiator may be used after addition is complete to reduce residual monomer levels.

"Dry polymer" means a polymer prepared by gel polymerization. In a gel polymerization process, an aqueous solution of water-soluble monomers, generally 20–60 percent concentration by weight, along with any polymerization or process additives such as chain transfer agents, chelants, pH buffers, or surfactants, is placed in an insulated reaction vessel equipped with a nitrogen purging tube. A polymerization initiator is added, the solution is purged with nitrogen, and the temperature of the reaction is allowed to rise uncontrolled. When the polymerized mass is cooled, the resultant gel is removed from the reactor, shredded, dried, and ground to the desired particle size.

In a preferred aspect of this invention, the water soluble cationic, amphoteric or zwitterionic polymers have a molecular weight of about 2,000 to about 10,000,000 dalton.

In another preferred aspect, the cationic polymer is a copolymer of acrylamide and one or more cationic monomers selected from diallyldimethylammonium chloride, dimethylaminoethylacrylate methyl chloride quaternary salt, dimethylaminoethylmethacrylate methyl chloride quaternary salt and dimethylaminoethylacrylate benzyl chloride quaternary salt.

In another preferred aspect, the cationic polymer has a cationic charge of at least about 5 mole percent.

In another preferred aspect, the cationic polymer is diallyldimethylammonium chloride/acrylamide copolymer.

In another preferred aspect, the amphoteric polymer is selected from dimethylaminoethyl acrylate methyl chloride quaternary salt/acrylic acid copolymer, diallyldimethylammonium chloride/acrylic acid copolymer, dimethylaminoethyl acrylate methyl chloride salt/N,N-dimethyl-N-methacrylamidopropyl-N-(3-sulfopropyl)-ammonium betaine copolymer, acrylic acid/N,N-dimethyl-N-methacrylamidopropyl-N-(3-sulfopropyl)-ammonium betaine copolymer and DMAEA.MCQ/Acrylic acid/N,N-dimethyl-N-methacrylamidopropyl-N-(3-sulfopropyl)-ammonium betaine terpolymer.

In another preferred aspect, the amphoteric polymer has a molecular weight of about 5,000 to about 2,000,000 dalton.

In another preferred aspect, the amphoteric polymer has a cationic charge equivalent to anionic charge equivalent ratio of about 0.2:9.8 to about 9.8:0.2.

In another preferred aspect, the cationic polymer has a cationic charge of 100 mole percent.

In another preferred aspect, the cationic polymer has a molecular weight of about 2,000 to about 500,000 dalton.

In another preferred aspect, the cationic polymer is selected from the group consisting of polydiallyldimethylammonium chloride, polyethyleneimine, polyepiamine, polyepiamine crosslinked with ammonia or ethylenediamine, condensation polymer of ethylenedichloride and ammonia, condensation polymer of triethanolamine and tall oil fatty acid, poly(dimethylaminoethylmethacrylate sulfuric acid salt) and poly(dimethylaminoethylacrylate methyl chloride quaternary salt).

In another preferred aspect, the water soluble zwitterionic polymer is composed of about 1 to about 99 mole percent of N,N-dimethyl-N-methacrylamidopropyl-N-(3-sulfopropyl)-ammonium betaine and about 99 to about 1 mole percent of one or more nonionic monomers.

In another preferred aspect, the nonionic monomer is acrylamide.

The MBR unit combines two basic processes: biological degradation and membrane separation-into a single process where suspended solids and microorganisms responsible for biodegradation are separated from the treated water by a membrane filtration unit. See *Water Treatment Membrane Processes*, McGraw-Hill, 1996, p 17.2. The entire biomass is confined within the system, providing for both control of the residence time for the microorganisms in the reactor (sludge age) and the disinfection of the effluent.

In a typical MBR unit, influent wastewater 7 is pumped or gravity flowed into the aeration tank 1 where it is brought into contact with the biomass, which biodegrades organic material in the wastewater. Aeration means 5 such as blowers provide oxygen to the biomass. The resulting mixed liquor is pumped from the aeration tank into the membrane module 2 where it is filtered through a membrane under pressure or is drawn through a membrane under low vacuum. The effluent 11 is discharged from the system while the concentrated mixed liquor is returned to the bioreactor. Excess sludge 9 is pumped out in order to maintain a constant sludge age, and the membrane is regularly cleaned by backwashing, chemical washing, or both.

Membranes used in the MBR unit include ultra-, micro- and nanofiltration, inner and outer skin, hollow fiber, tubular, and flat, organic, metallic, ceramic, and the like. Preferred membranes for commercial application include hollow fiber with an outer skin ultrafilter, flat sheet (in stacks) microfilter and hollow fiber with an outer skin microfilter.

Preferred membrane materials include chlorinated polyethylene (PVC), polyvinylidene fluoride (PVDF), polyacrylonitrile (PAN), polysulfone (PSF), polyethersulfone (PES), polyvinylalcohol (PVA), cellulose acetate (CA), regenerated cellulose (RC) as well as inorganics.

Additional sludge disintegration devices 6 can be attached to the MBR to enhance sludge decay. Excess sludge 9 from the aeration tank 1 is pumped into the disintegration device for further degradation. The liquified sludge 8 exiting the disintegration devices is recycled to bioreactor again and will be used as feed. Examples of sludge disintegration devices include ozonation, alkaline treatment, heat treatment, ultrasound, and the like. In this case protoplasmic materials contained in the disintegrated sludge will contribute to increased biopolymer (i.e. proteins, polysaccharides) levels in the mixed liquor. This additional biopolymer is removed by the polymer treatment described herein.

The wastewater may be pretreated before entering the MBR. For example, a bar screen, grit chamber or rotary drum screen may be used to achieve coarse solids removal.

In industrial plants where synthetic oils are present in the untreated wastewater, such as an oil refinery, pretreatment to remove oil is accomplished in units such as the inclined plate separator and the induced air flotation unit (IAF). Often, a cationic flocculant, such as a co-polymer of DMAEM and AcAm, is used in the IAF unit to increase oil removal. Also, excess phosphate is sometimes precipitated in the bioreactor by the addition of metal salts such as ferric chloride, so that the phosphate does not pass through the membrane and into the final effluent.

Depending on the ultimate use of the water and the purity of the MBR permeate, the clarified wastewater may also be subjected to post treatment. For instance, in water reclamation where treated wastewater is ultimately recharged into an aquifer used as a source for drinking water, the permeate may be further treated with reverse osmosis (RO) to reduce the dissolved mineral content. If the water is to be recycled into a process, then the requirements of that process may necessitate further treatment of the permeate for removal of recalcitrant organics not removed by the MBR. Processes such as nanofiltration or carbon adsorption might be used in these cases. Finally, all biologically treated wastewater may be further disinfected prior to discharge into a receiving stream, generally by addition of sodium hypochlorite, although this is not required for discharge into a municipal sewer.

As discussed above, in the MBR process complete retention of the biomass by the membrane process makes it possible to maintain high MLSS in bioreactor, and this high MLSS allows for a longer solid retention time (SRT). Consequently, the MBR sludge production rate, which is inversely proportional to the SRT, is much reduced compared to the conventional activated sludge process, to about 0.3 kg sludge/kg COD. However, the expense for sludge treatment in the MBR plant is still estimated to be 30~40% of the total expense.

As discussed above, sludge production can be much reduced simply by increasing HRT or target MLSS of bioreactor. However, this method will accelerate membrane fouling and may finally increase 'membrane cleaning frequency'.

In fact high HRT and high MLSS cause high SRT. Under these conditions, microorganisms remain in the bioreactor for an extended period, during which time some old microorganisms decay automatically. During this decay process, substantial amounts of miscellaneous protoplasmic materials such as polysaccharides, proteins etc are produced. These materials are commonly referred to as 'biopolymer'. This biopolymer will be added to the background biopolymer, so called extra-cellular polymer (ECP) secreted by microorganisms. Consequently high SRT causes a high level of biopolymer which is a major membrane foulant.

Therefore, sludge reduction by increasing HRT and/or MLSS is limited by accelerated membrane fouling by biopolymer. The high level of soluble biopolymer in-mixed liquor can be reduced by using the polymers of this invention to react with and coagulate and flocculate the biopolymer forming insoluble precipitate into larger particles.

In practice, in a new MBR facility sludge production can be decreased by about 50–90 percent as use of polymers as described herein allows for increasing HRT to about 10–15 hours without an increase in MLSS.

In the case of an existing facility where HRT is fixed, sludge production can be decreased by about 30–50 percent as use of polymers as described herein permits increasing MLSS by about 2–2.5 percent.

The cationic, amphoteric or zwitterionic polymers are introduced into the aeration basin/bioreactor by various means, for example by dosing into the wastewater feed line ahead of the bioreactor or by dosing directly into the bioreactor.

In all cases, the polymer should be thoroughly mixed with the mixed liquor in the bioreactor to maximize adsorption. This may be accomplished by feeding the polymer into an area of the bioreactor where an aeration nozzle is located. So-called "dead" zones in the bioreactor having little to no flow should be avoided. In some cases, a submerged propeller mixer may be needed to increase mixing in the basin, or the sludge can be re-circulated through a side arm loop.

Solution polymers can be dosed using a chemical metering pump such as the LMI Model 121 from Milton Roy (Acton, Mass.).

The recommended polymer dosage, based on mixed liquor in the bioreactor, is about 1 to about 2000 ppm on active basis, at MLSS (mixed liquor suspended solids) of approximately 1–2%. If the MLSS is lower than 1%, a proportionately lower dosage of polymer may be used. The polymer can be periodically pumped directly to the bioreactor mixed liquor or into the wastewater feed line The polymer may be pumped intermittently ("slug fed") or continuously to the wastewater. If polymer is fed continuously to the wastewater feed, then dosage would be considerably lower, about 0.25 to about 10 ppm.

Overdosing polymer may result in reduced biological activity and organics removal in the bioreactor. For this reason, a low polymer dosage should be used initially: for example about 25 to about 100 ppm in the mixed liquor. Additional polymer can then be fed to increase flux while maintaining biological activity. Permeate TOC (total organic carbon), COD (chemical oxygen demand), or BOD (biological oxygen demand) can be monitored to ascertain biological activity.

Alternately, a jar test can be conducted with samples of mixed liquor. Using a four paddle mixer, the sample jars are dosed with sequentially higher amounts of polymer; one jar is left untreated. After mixing, the samples are allowed to sit for several hours, so that the solids can settle to the bottom of the jar. The turbidity of the water on top of the settled solids (supernatant) is measured to ascertain the effectiveness of the polymer dosage. A turbidimeter from Hach Company (Loveland, Colo.) could be used. A dosage that gives lower turbidity in the jar than the untreated sample will usually increase flux in the MBR.

In the event of a polymer overdose, dosing of polymer should be halted until biological activity returns to normal levels. It may also be necessary to discharge more sludge from the bioreactor to assist in recovery of bioactivity. Addition of bioaugmentation products containing appropriate bacteria may also be helpful in recovering activity after polymer overdose.

The foregoing may be better understood by reference to the following Examples, which are presented for purposes of illustration and are not intended to limit the scope of this invention.

Representative cationic, amphoteric and zwitterionic polymers of this invention are listed in Table 3. Polymers B and C are from Ciba (Tarrytown, N.Y.); Polymers M and N are from BASF (Mount Olive, N.J.). All other polymers are from Ondeo Nalco Company, Naperville, Ill.

TABLE 3

Representative Polymers

| Polymer | Chemistry | Mol. Wt. | I.V. (RSV) | % Actives |
|---|---|---|---|---|
| A | Epi-DMA, ammonia crosslinked | | 0.18 | 50 |
| B | Epi-DMA, EDA crosslinked | | 0.3 | 50 |
| C | Epi-DMA, EDA crosslinked | | | 45 |
| D | Epi-DMA, linear | | 0.1 | 50 |
| E | PDADMAC | | 0.2 | 30 |
| F | pDADMAC | | 1.0 | 18 |
| G | Ethylene dichloride/ammonia polymer | <15,000 | | 30 |
| H | Poly(dimethylaminoethylmethacrylate sulfuric acid salt) | 100,000 | | 30–40 |
| I | Poly(triethanolamine methy chloride quaternary salt) | 50,000 | | 100 |
| J | Poly(bis-hexamethylene-triamine), crosslinked by EO on diethyene glycol capped with diepichlorohydrin, further cross-linked by EP-HCl salt | <500,000 | | 50 |
| K | Copolymer of N,N-diallylcyclohexylamine/N-allylcyclohexylamine mixture and acrylamide | <500,000 | | 80 |
| L | Copolymer of triethanol-amine and tall oil fatty acid, methyl chloride quaternary salt | <100,000 | | 50 |
| M | Polyethyleneimine | | 0.32 | 20 |
| N | Polyethyleneimine, crosslinked with EO | | 0.35 | 20 |
| O | DADMAC/acrylamide copolymer | | 1.2 | 20 |
| P | Dimethylaminoethyl-acrylate methyl chloride quaternary salt)/Acrylamide copolymer | | 16–24 | 30 |
| Q | Dimethylaminoethyl acrylate methyl chloride quaternary salt/acrylic acid (70:30 mol:mol) copolymer | | | 25 |
| R | DADMAC/Acrylic acid (90:10 mol:mol) copolymer | | 1.2 | 20 |
| S | DADMAC/Acrylic acid (51:49 mol:mol) copolymer | | (0.9) | 35 |
| T | Acrylamide/N,N-dimethyl-N-methacryl-amidopropyl-N-(3-sulfopropyl)-ammonium betaine (99:1 mol:mol) copolymer | | (20–25) | |

TABLE 3-continued

Representative Polymers

| Polymer | Chemistry | Mol. Wt. | I.V. (RSV) | % Actives |
|---|---|---|---|---|
| U | Acrylamide/N,N-dimethyl-N-methacryl-amidopropyl-N-(3-sulfopropyl)-ammonium betaine/dimethylamino-ethylacrylate methyl chloride quaternary salt (99.5:1:0.5 mol:mol:mol) terpolymer | | (20–25) | |

EXAMPLE 1

Sample of aerobically digested mixed liquor from a midwestern municipal wastewater treatment plant (TSS about 10–1.5%) is mixed with representative water soluble polymer of this invention using a paddle stirrer at 110 rpm for 5 minutes. The mixture is then placed in an Amicon Model 8400 Stirred Cell (Millipore Corporation, Bedford, Mass.) and forced through a Durapore® polyvinylidenedifluoride membrane with a nominal pore size of 0.1 micron and effective membrane area of 0.0039 m$^2$ (Millipore Corporation, Bedford, Mass.), at a constant pressure of 26 lbs/in$^2$ (psi). Flux is determined by weighing permeate at timed intervals on a Mettler Toledo Model PG5002S top loading balance. Weight is recorded in 2 or 6 second intervals by computer. Volume is calculated assuming density of 1.00 g/mL, and no temperature correction for density is made. Flux is calculated as follows:

$$J = 913.7\, \Delta W/\Delta t$$

where J=flux (L/m$^2$/hour);

ΔW=difference between 2 weight measurements (in grams); and

Δt=difference between 2 time measurements (in seconds).

The results are shown in Table 4.

TABLE 4

Membrane Flux for Representative Cationic Polymers in Mixed Liquor @ 26 psi

| Polymer | Active Dosage, ppm | Flux, LMH at 80 g |
|---|---|---|
| None | 0 | 65 |
| A | 50 | 576 |
| A | 100 | 1296 |
| A | 150 | 2088 |
| D | 100 | 295 |
| E | 150 | 900 |
| E | 90 | 612 |
| E | 30 | 252 |
| F | 150 | 1836 |

Additional tests are performed on mixed liquor from the same municipal plant. In these tests the mixed liquor samples with and without polymer are mixed at 275 RPM for 15 minutes before testing in the Amicon cell. Feed pressure to the cell is 15 psi. The results are shown in Table 5.

TABLE 5

Membrane Flux for Representative Cationic Polymers in Mixed Liquor @ 15 psi

| Polymer | Actives Dosage (ppm) | Flux LMH at 80 g (70 g) |
|---|---|---|
| None | 0 | 57.6 |
| A | 100 | 410.4 |
| I | 100 | 358.9 |
| H | 100 | 359.3 |
| L | 100 | 181.4 |
| K | 100 | 57.24 |
| G | 100 | 284.4 |
| N | 100 | 286.9 |
| M | 100 | 1728 |
| M | 80 | 860.4 |
| M | 40 | 482.4 |
| M | 20 | 162 |
| None | 0 | (49) |
| A | 100 | (522) |
| P | 100 | (183) |

The data in Tables 4 and 5 clearly show a significant increase in flux through the membrane using water soluble cationic polymers to treat the sludge. In particular, $NH_3$-crosslinked Epi-DMA shows as much as a 700% increase in flux, and PEI shows about a 1500% increase. Other cationic polymers, including linear epi-DMA and pDADMAC) also show increased flux relative to no treatment of the sludge.

EXAMPLE 2

Excess soluble cationic polymer is measured by adding varying amounts of a representative cationic polymer (Epi-DMA) to mixed liquor from a midwestern municipal wastewater treatment plant, stirring the mixture at 110 rpm, centrifuging the mixture at 20,000 rpm for 25 minutes and then measuring the residual polymer in the centrate by colloid titration with a 0.001M solution of the potassium salt of polyvinylsulfuric acid (PVSK). The results are summarized in Table 6.

TABLE 6

Residual Polymer in Centrate in ppm

| Polymer Actives In Sludge | Polymer Actives In Centrate |
|---|---|
| 0 | 0 |
| 22.5 | 0 |
| 45 | 0 |
| 90 | 0 |
| 135 | 0 |
| 1350 | 4.5 |
| 1800 | 79.7 |
| 2250 | 211 |
| 4500 | 1650 |

As shown in Table 6, no residual polymer is detected in the centrifuge water centrate at polymer dosages that result in substantial increases in membrane flux. Dosages 30 times more than optimum are required for excess residual polymer to begin to appear in the centrate. This is very important discovery because excess polymer is known to foul membrane surfaces resulting in dramatic decreases in membrane flux.

EXAMPLE 3

Five gallon buckets of mixed liquor are taken from a western United States MBR unit treating municipal wastewater, air-freighted overnight and tested the next day. The sample is refrigerated overnight and then warmed to room temperature for testing on subsequent days. Cationic polymer (2.0 g of a 1% polymer solution) and 198 g of mixed liquor are added to a 400 ml beaker. The mixture is stirred on a motorized stirrer for 15 minutes at 275 rpm to redisperse the solids. This mixed sludge is transferred to the Amicon cell with a polyvinylidenedifluoride membrane with nominal pore size of 0.2 microns just before the filtration test is performed.

The mixture is forced through the membrane at a constant pressure of either 15 or 8 psi. Flux was determined by weighing permeate at timed intervals on a Mettler Toledo Model PG5002S top loading balance. Weight is recorded in 2 second intervals by computer. Volume was calculated assuming density of 1.00 g/mL, and no temperature corrections for density were made. Flux was calculated as explained in Example 1.

At the end of the sludge sample test, the membrane is discarded. All tests with polymer treatment include a test in which no polymer is dosed to establish the baseline conditions. This test compares polymer-treated sludge flux rates to untreated mixed liquor flux rates. This is done for quantification of the effects of dosage, chemistry, pressure, etc., on flux. The results are shown in Table 7.

TABLE 7

Membrane Flux for Representative Cationic Polymers in MBR Mixed Liquor at 15 and 8 psi

| Polymer | Pressure psi | Actives Dosage ppm | Flux at 80 g LMH* |
|---|---|---|---|
| none | 15 | 0 | 311.4 |
| A | 15 | 25 | 806.4 |
| A | 15 | 50 | 1155.6 |
| A | 15 | 100 | 1512 |
| M | 15 | 0 | 370.8 |
| M | 15 | 20 | 928.8 |
| M | 15 | 40 | 1915.2 |
| none | 8 | 0 | 138.2 |
| A | 8 | 25 | 367.2 |
| A | 8 | 50 | 500.4 |
| A | 8 | 100 | 694.8 |

*Clean water flux at 8 psi was 1440 LMH and at 15 psi was 2160 LMH.

The data in Table 7 clearly show a significant increase in flux through the membrane at both pressures of 8 and 15 psi using cationic polymers A and M to condition the sludge before the test.

EXAMPLE 4

Mixed liquor from a midwestern United States MBR unit treating municipal wastewater MBR is mixed with amphoteric polymer Q at different dosages and then filtered through a flat sheet Kubota membrane using a dead-end filtration cell at 15 psig with stirring of the treated mixed liquor (300 rpm) at 22° C. The control mixed liquor without polymer treatment is also filtered under similar conditions. The percent enhancement in the permeate flux after treatment with amphoteric polymer at different dosages is shown in Table 8.

TABLE 8

Membrane Flux Enhancement for Representative
Amphoteric Polymer in a Midwestern MBR Mixed Liquor

| Polymer dosage (ppm-active) | % Flux Enhancement |
|---|---|
| 75 | 23 |
| 250 | 32 |
| 875 | 55 |
| 2000 | 117 |

The data in Table 8 clearly show a significant increase in flux through the membrane relative to control using a representative amphoteric polymer to condition the mixed liquor before the test.

EXAMPLE 5

Mixed liquor from a western United States MBR unit treating municipal wastewater is mixed with amphoteric polymer Q and membrane flux is measured using the method of Example 4. The results are shown in Table 9 below.

TABLE 9

Membrane Flux Enhancement for Representative
Amphoteric Polymer in a Western MBR Mixed Liquor

| Polymer dosage (ppm-active) | % Flux Enhancement |
|---|---|
| 25 | 4 |
| 75 | 485 |
| 250 | 818 |

The data in Table 9 clearly show a significant increase in flux through the membrane relative to control using a representative amphoteric polymer to condition the mixed liquor before the test.

EXAMPLE 6

Mixed liquor from a western United States MBR unit treating municipal wastewater is mixed with amphoteric polymer R and membrane flux is measured using the method of Example 4. The results are shown in Table 10 below.

TABLE 10

Membrane Flux Enhancement for Representative
Amphoteric Polymer in a Western MBR Mixed Liquor

| Polymer dosage (ppm-active) | % Flux Enhancement |
|---|---|
| 105 | 28 |
| 350 | 34 |

The data in Table 10 clearly show a significant increase in flux through the membrane relative to control using a representative amphoteric polymer to condition the mixed liquor before the test.

EXAMPLE 7

In order to confirm the complexation of polysaccharide from the mixed liquor with the amphoteric polymer, the calorimetric test for polysaccharide level is conducted on the centrate of mixed liquor obtained after polymer addition to the mixed liquor and subsequent centrifugation.

Table 11 shows the amount of residual glucose (a direct measure of polysaccharide) in the mixed liquor after complexation with amphoteric polymer Q for MBR mixed liquor from a western USA MBR unit treating municipal wastewater.

TABLE 11

Effect of a Representative Amphoteric Polymer on
Polysaccharide Level in Mixed Liquor from a Western USA MBR

| Polymer dosage (ppm-active) | Glucose (ppm) |
|---|---|
| 0 (Control) | 7.96 |
| 25 | 4.14 |
| 75 | 3.50 |
| 250 | 3.80 |

As shown in Table 11, conditioning of mixed liquor with a representative polymer of this invention results in a substantial decrease in the polysaccharide level in the MBR mixed liquor, resulting in significant flux enhancement, shown in Table 9.

In addition, no residual polymer is detected in the centrate of the mixed liquor from a Midwestern USA MBR after addition of up to 2000 ppm-active of amphoteric polymer Q and centrifugation of this treated mixed liquor. This indicates almost complete consumption of added polymer for coagulation of suspended solids and complexation with soluble biopolymer. Therefore it is unlikely that the added amphoteric polymer will contribute itself to the membrane fouling, while yielding the higher permeate fluxes.

Furthermore, the permeate quality is not compromised by the polymer treatment as evidenced by a permeate turbidity that is generally below 0.5 NTU for both the Western and Midwestern USA MBR sludge mixed liquor after polymer treatment.

EXAMPLE 7

Western USA mixed liquor is treated with a representative amphoteric polymer as described in example 4, except using a flow through cell with submerged membranes. The extent of flux enhancement is reflected from the amount of suction pressure required for a constant permeate flux. Thus, the higher the suction pressure that is required for a given permeate flux, the higher the membrane fouling. The suction pressure profile is measured over a period of 24 hours for control and polymer treated mixed liquor for a constant permeate flux of 30 LMH. The sludge volume is 8 L and the air-flow rate for membrane scouring is 10 l/min (LPM). The results are shown in Table 12.

TABLE 12

Effect of a Representative Amphoteric
Polymer Treatment on Suction Pressure
for Permeation of Mixed Liquor from a
Western USA MBR Through Membrane

| | Suction Pressure (psig) | |
|---|---|---|
| Time (hr) | Control | Treated with 13 ppm-active polymer |
| 0 | 0 | 0 |
| 3 | 0.44 | 0.22 |
| 6 | 1.18 | 0.30 |

TABLE 12-continued

Effect of a Representative Amphoteric
Polymer Treatment on Suction Pressure
for Permeation of Mixed Liquor from a
Western USA MBR Through Membrane

| | Suction Pressure (psig) | |
|---|---|---|
| Time (hr) | Control | Treated with 13 ppm-active polymer |
| 9 | 1.74 | 0.47 |
| 12 | 2.27 | 0.65 |
| 15 | 2.79 | 0.86 |
| 18 | 3.21 | 1.07 |
| 21 | 3.75 | 1.34 |
| 24 | 4.05 | 1.61 |

EXAMPLE 8

Biopolymer removal efficacy by cationic polymer is also determined by IR analysis as follows. Mixed liquor of MBR is spun down and supernatant is obtained. A representative cationic polymer P is then added. IR analysis of the precipitate and supernatant revealed that the majority of biopolymer originally contained in the supernatant is found in the precipitate while only a trace is found in bulk. Moreover there has not been any evidence that cationic polymer causes membrane fouling at a concentration of up to 100 ppm in the mixed liquor.

A three-month pilot experiment further reveals that membrane fouling is delayed with polymer P. In the case of batch experiment performed with a stirred cell, flux decline is not observed even with 1,000 ppm of polymer P. Additionally, bio-activity also is not affected by cationic polymers such as polymer P and polymer A at an extremely high polymer concentration of 3,000 ppm.

Although this invention has been described in detail for the purpose of illustration, it is to be understood that such detail is solely for that purpose and that numerous modifications, alterations and changes can be made therein by those skilled in the art without departing from the spirit and scope of the invention except as it may be limited by the claims. All changes which come within the meaning and range of equivalency of the claims are to be embraced within their scope.

What is claimed is:

1. A method of conditioning mixed liquor having a mixed liquor suspended solids loading of about 5 g/L to about 30 g/L in a membrane iological reactor comprising adding to the mixed liquor an effective coagulating and flocculating amount of one or more water soluble cationic, aniphoteric or zwitterionic polymers, or combination thereof.

2. The method of claim 1 wherein the water soluble cationic, amphoteric or zwitterionic polymers have a molecular weight of about 2,000 to about 10,000,000 dalton.

3. The method of claim 1 wherein the cationic polymer is copolymer of acrylamide and one or more cationic monomers selected from diallyldimethylammonium chloride, dimethylaminoethylacrylate methyl chloride quaternary salt, dimethylaminoethylmethacrylate methyl chloride quaternary salt and dimethylaminoethylacrylate benzyl chloride quaternary salt.

4. The method of claim 3 wherein the cationic polymer has a cationic charge of at least about 5 mole percent.

5. The method of claim 3 wherein the cationic polymer is diallyldimethylammonium chloride/acrylamide copolymer.

6. The method of claim 1 wherein the amphoteric polymer is selected from dimethylaminoethyl acrylate methyl chloride quaternary salt/acrylic acid copolymer, diallyldimethylammonium chloride/acrylic acid copolymer, dimethylaminoethyl acrylate methyl chloride salt/N,N-dimethyl-N-methacrylamidopropyl-N-(3-sulfopropyl)-ammonium betaine copolymer, acrylic acid/N,N-dimethyl-N-methacrylamidopropyl-N-(3-sulfopropyl)-ammonium betaine copolymer and DMAEA.MCQ/Acrylic acid/N,N-dimethyl-N-methacrylamidopropyl-N-(3-sulfopropyl)-ammonium betaine terpolymer.

7. The method of claim 6 wherein the amphoteric polymer has a molecular weight of about 5,000 to about 2,000,000 dalton.

8. The method of claim 6 wherein the amphoteric polymer has a cationic charge equivalent to anionic charge equivalent ratio of about 0.2:9.8 to about 9.8:0.2.

9. The method of claim 6 wherein the cationic polymer has a cationic charge of 100 mole percent.

10. The method of claim 9 wherein the cationic polymer has a molecular weight of about 2,000 to about 500,000 dalton.

11. The method of claim 9 wherein the water soluble cationic polymer is selected from the group consisting of polydiallyldimethylammonium chloride, polyethyleneimine, polyepiamine, polyepiamine crosslinked with ammonia or ethylenediamine, condensation polymer of ethylenedichloride and ammonia, condensation polymer of triethanolamine an tall oil fatty acid, poly(dimethylaminoethylmethacrylate sulfuric acid salt) and poly(dimethylaminoethylacrylate methyl chloride quaternary salt).

12. The method of claim 1 wherein the water soluble zwitterionic polymer is a composed of about 1 to about 99 mole percent of N,N-dimethyl-N-methacrylamidopropyl-N-(3-sulfopropyl)-ammonium betaine and about 99 to about 1 mole percent of one or more nonionic monomers.

13. The method of claim 12 wherein the nonionic monomer is acrylamide.

14. A method of clarifying wastewater in a membrane biological reactor where microorganisms consume organic material in the wastewater to form a mixed liquor comprising water having a mixed liquor suspended solids loading of about 5 g/L to about 30 g/L, the microorganisms and dissolved and suspended solids comprising
  (i) adding to the mixed liquor an effective coagulating and flocculating amount of one or more cationic, amphoteric or zwitterionic polymers, or a mixture thereof, to form a mixture comprising water, the microorganisms and coagulated and flocculated solids; and
  (ii) separating clarified water from the microorganisms and the coagulated and flocculated solids by filtration through a membrane.

15. A method of preventing fouling of a filtration membrane in a membrane biological reactor where microorganisms consume organic material in the wastewater in a mixed liquor comprising water having a mixed liquor suspended solids loading of about 5 g/L to about 30 g/L, the microorganisms and dissolved, colloidal and suspended solids and wherein clarified water is separated from the mixed liquor by filtration through the filtration membrane comprising adding to the mixed liquor an amount of one or more cationic, amphoteric or zwitterionic polymers, or a combination thereof, sufficient to prevent fouling of the membrane.

16. A method of enhancing flux through a filtration membrane in a membrane biological reactor where microorganisms consume organic material in the wastewater in a mixed liquor comprising water having a mixed liquor suspended solids loading of about 5 g/L to about 30 g/L, the microorganisms and dissolved, colloidal and suspended solids and wherein clarified water is separated from the mixed liquor by filtration through the filtration membrane comprising adding to the mixed liquor an effective flux enhancing amount of one or more cationic, amphoteric or zwitterionic polymers, or a combination thereof.

17. A method of reducing sludge formation in a membrane biological reactor where microorganisms consume organic material in the wastewater to form a mixed liquor comprising water having a mixed liquor suspended solids loading of about 5 g/L to about 30 g/L, the microorganisms and a sludge comprising dissolved, colloidal and suspended solids and wherein clarified water is separated from the mixed liquor by filtration through a membrane comprising adding to the mixed liquor an effective sludge reducing amount of one or more cationic, amphoteric or zwitterionic polymers, or a combination thereof.

* * * * *